United States Patent
Randall et al.

(10) Patent No.: US 10,138,351 B2
(45) Date of Patent: Nov. 27, 2018

(54) RUBBER COMPOSITIONS AND USES THEREOF

(71) Applicant: Bridgestone Corporation, Chuo-ku (JP)

(72) Inventors: Amy M. Randall, Akron, OH (US); Kevin M. McCauley, Akron, OH (US); Sheel P. Agarwal, Solon, OH (US); Christopher G. Robertson, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

(21) Appl. No.: 15/519,014

(22) PCT Filed: Oct. 15, 2015

(86) PCT No.: PCT/US2015/055647
§ 371 (c)(1),
(2) Date: Apr. 13, 2017

(87) PCT Pub. No.: WO2016/061304
PCT Pub. Date: Apr. 21, 2016

(65) Prior Publication Data
US 2017/0233549 A1 Aug. 17, 2017

Related U.S. Application Data

(60) Provisional application No. 62/064,139, filed on Oct. 15, 2014.

(51) Int. Cl.
| | | |
|---|---|---|
| *C08K 5/20* | (2006.01) | |
| *C08K 5/098* | (2006.01) | |
| *C07F 1/08* | (2006.01) | |
| *C07C 233/77* | (2006.01) | |
| *C08K 3/04* | (2006.01) | |
| *B60C 1/00* | (2006.01) | |
| *C08K 5/00* | (2006.01) | |
| *C08K 5/01* | (2006.01) | |

(52) U.S. Cl.
CPC ............. *C08K 5/20* (2013.01); *B60C 1/0016* (2013.01); *B60C 1/0025* (2013.01); *C07C 233/77* (2013.01); *C07F 1/08* (2013.01); *C08K 5/098* (2013.01); *C08K 3/04* (2013.01); *C08K 5/0083* (2013.01); *C08K 5/01* (2013.01)

(58) Field of Classification Search
CPC .. C08K 5/20; C08K 5/098; C08K 3/04; B60C 1/0016; B60C 1/0025; C07C 233/77; C07F 1/08
See application file for complete search history.

(56) References Cited

U.S. PATENT DOCUMENTS

| | | | |
|---|---|---|---|
| 4,394,473 A | 7/1983 | Winter et al. | |
| 4,534,799 A | 8/1985 | Aguirre | |
| 4,645,792 A | 2/1987 | Chatterjee | |
| 5,962,562 A * | 10/1999 | Wideman | C08K 5/20 524/222 |
| 2004/0132912 A1* | 7/2004 | McElwee | C08K 5/098 525/326.1 |
| 2005/0234165 A1 | 10/2005 | Schaal et al. | |
| 2007/0142514 A1 | 6/2007 | Ishikawa | |
| 2009/0093593 A1 | 4/2009 | Kato et al. | |
| 2010/0317782 A1 | 12/2010 | Hattori | |
| 2011/0028598 A1 | 2/2011 | Veyland et al. | |
| 2013/0190435 A1 | 7/2013 | Skoumal et al. | |
| 2013/0253088 A1 | 9/2013 | Agarwal | |
| 2013/0310512 A1 | 11/2013 | Imoto et al. | |

FOREIGN PATENT DOCUMENTS

| | | |
|---|---|---|
| CN | 101255262 A | 9/2008 |
| CN | 103937235 A | 7/2014 |
| CN | 104059287 A | 9/2014 |
| EP | 123823 A1 | 9/1986 |
| EP | 0570160 A2 | 11/1993 |
| EP | 1860136 A1 | 11/2007 |
| JP | H07-278355 A | 10/1995 |
| JP | 2006-176579 A | 7/2006 |
| WO | 2001088027 A1 | 11/2001 |
| WO | 03/091324 A1 | 11/2003 |
| WO | 2010016946 A2 | 2/2010 |

OTHER PUBLICATIONS

Terech, Pierre, et al., "Structure of a Transient Network Made up of Entangled Monomolecular Organometallic Wires in Organic Liquids. Effects of an Endcapping Molecule," Langmuir, 1999, vol. 15, pp. 5513-5525.

(Continued)

*Primary Examiner* — Robert D. Harlan
(74) *Attorney, Agent, or Firm* — Meredith E. Hooker; Jenny L. Sheaffer

(57) ABSTRACT

The present disclosure is directed to rubber compositions containing a chemical additive capable of generating or enhancing strain-induced crystallization into the compositions, and tires containing the rubber compositions in one or more components such as sidewalls or treads. The chemical additive is at least one nucleating agent of formula (I) or formula (II). As well, certain embodiments relate to methods for achieving reduced wear or improved durability in a tire tread or tire sidewall by using the chemical additives.

21 Claims, No Drawings

(56) References Cited

OTHER PUBLICATIONS

Terech, Pierre, et al., "Low Molecular Mass Gelators of Organic Liquids and the Properties of their Gels," Chem. Rev., v. 97, pp. 3133-3159 (1997).
Shepard, Thomas A., et al., Self-Organization and Polyolefin Nucleating Efficacy of 1,3:2,4-Di-p-methylbenzylidene Sorbitol, J. of Polymer Science: Part B: Polymer Physics, vol. 35, pp. 2617-2628 (1997).
Roosma, Jorg, et al., "Supramolecular Materials From Benzene-1,3,5-tricarboxamide-Based Nanorods," J. Am. Chem. Soc., vol. 130, pp. 1120-1121 (2008).
Mes, Tristan, et al., "Hydrogen-Bond Engineering in Supramolecular Polymers: Polarity Influence on the Self-Assembly of Benzene-1,3,5-Tricarboxamides," Macromolecules, vol. 43, pp. 1981-1991 (2010).
Feng, L., et al., "Thermodynamics of Tripodal Trisamide-Solvent Organogels," Abstracts of Papers, 241st ACS National Meeting & Exposition, Anaheim, CA, United States, Mar. 27-31, 2011, Poly-261 (Abstract only).
Aquino, Manuel A.S., "Diruthenium and diosmium tetracarboxylates: synthesis, physical properties and applications," Coordination Chemistry Reviews, v. 170, issue 1, pp. 141-202 (Mar. 1998), Abstract only.
"Activators" excerpt from Rubber Handbook by Struktol, Sep. 2004, pp. 54-60.
International Preliminary Report on Patentability and Opinion from PCT application PCT/US2015/055647 (dated Apr. 18, 2017).
International Search Report from PCT application PCT/US2015/055647 (dated Jan. 28, 2016).
International Preliminary Report on Patentability and Opinion from PCT application PCT/US2015/055641 (dated Apr. 18, 2017).
International Search Report from PCT application PCT/US2015/055641 (dated Feb. 5, 2016).
Communication from European Patent Office including Supplementary European Search Report in application EP15849971, dated May 7, 2018 (5 pages).
Communication from European Patent Office including Supplementary European Search Report in application EP15850937, dated May 8, 2018 (6 pages).

* cited by examiner

RUBBER COMPOSITIONS AND USES THEREOF

FIELD

The present application is directed to rubber compositions containing chemical additives capable of generating or enhancing strain-induced crystallization into the compositions.

BACKGROUND

Natural rubber is known to exhibit a high level of strain-induced crystallization. Strain-induced crystallization is a phase transformation that an amorphous material undergoes when subjected to stress (strain). Generally, crystalline polymer chains are ordered (parallel) and closely packed, and amorphous polymer chains are disordered. The mechanism of strain-induced crystallization is believed to be a primary contributor to natural rubber's unique properties, including its outstanding tensile strength and good crack growth resistance. Synthetic rubbers such as polyisoprene, polybutadiene and styrene-butadiene copolymer do not inherently exhibit the high level of strain-induced crystallization that natural rubber possesses.

SUMMARY

The embodiments described herein relate to rubber compositions containing chemical additives capable of generating or enhancing strain-induced crystallization into the compositions, and tires containing the rubber compositions in one or more components such as sidewalls or treads. As well, certain embodiments relate to methods for achieving reduced wear or improved durability in a tire tread or tire sidewall by using the chemical additives.

In a first embodiment, the present disclosure is directed to a rubber composition comprising: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent having formula (I): $M_2(O_2CR)_4$ (I), where M is a transition metal selected from the group consisting of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, mercury, and iridium and R is selected from C3-C18 alkyl; (d) 1 to 20 phr of at least one processing oil; and (e) 0-100 phr of at least one reinforcing filler. Furthermore, upon curing the rubber composition meets at least one of (i) or (ii), as follows: (i) exhibits reduced wear as exhibited by having a wear index (measured at 25% slip) that is 110% or higher, based upon a comparative rubber compound that contains no nucleating agent of formula (I) but contains additional processing oil in a phr amount equal to the amount of the at least one nucleating agent of formula (I); and (ii) exhibits strain-induced crystallization.

In a second embodiment, the present disclosure is directed to a rubber composition comprising: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent with a molecular weight of 250-1000 grams/mole and having formula (II): $N(R^2NHC(=O)R^3)_3$ (II), wherein $R^2$ is selected from C1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic; (d) 1 to 20 phr of at least one processing oil; and (e) 0-100 phr of at least one reinforcing filler. Furthermore, upon curing the rubber composition meets at least one of (i) or (ii), as follows: (i) exhibits reduced wear as exhibited by having a wear index (measured at 65% slip) that is 110% or higher, based upon a comparative rubber compound that contains no nucleating agent of formula (I) but contains additional processing oil in a phr amount equal to the amount of the at least one nucleating agent of formula (II), and (ii) exhibits strain-induced crystallization.

In a third embodiment, the present disclosure is directed to a method of achieving reduced wear or improved durability in a tire tread or tire sidewall. The method comprises incorporating the rubber composition of the first or second embodiment into a tire tread or sidewall.

In a fourth embodiment, the present disclosure is directed to a method of achieving strain-induced crystallization in a synthetic rubber-based rubber composition. The method comprises using the rubber composition of the first or second embodiment, along with a cure package, wherein upon curing the rubber composition exhibits strain-induced crystallization.

DETAILED DESCRIPTION

The present disclosure relates to the use of chemical additives in rubber compositions which additives have the ability to generate or enhance strain-induced crystallization, thereby leading to reduced wear or improved durability when the rubber compositions are utilized in tires.

As discussed above, in a first embodiment, the present disclosure is directed to a rubber composition comprising: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent having formula (I): $M_2(O_2CR)_4$ (I), where M is a transition metal selected from the group consisting of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, mercury, and iridium and R is selected from C3-C18 alkyl; (d) 1 to 20 phr of at least one processing oil; and (e) 0-100 phr of at least one reinforcing filler. Furthermore, upon curing the rubber composition meets at least one of (i) or (ii), as follows: (i) exhibits reduced wear as exhibited by having a wear index (measured at 25% slip) that is 110% or higher, based upon a comparative rubber compound that contains no nucleating agent of formula (I) but contains additional processing oil in a phr amount equal to the amount of the at least one nucleating agent of formula (I); and (ii) exhibits strain-induced crystallization.

In a second embodiment, the present disclosure is directed to a rubber composition comprising: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent with a molecular weight of 250-1000 grams/mole and having formula (II): $N(R^2NHC(=O)R^3)_3$ (II), wherein $R^2$ is selected from C1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic; (d) 1 to 20 phr of at least one processing oil; and (e) 0-100 phr of at least one reinforcing filler. Furthermore, upon curing the rubber composition meets at least one of (i) or (ii), as follows: (i) exhibits reduced wear as exhibited by having a wear index (measured at 65% slip) that is 110% or higher, based upon a comparative rubber compound that contains no nucleating agent of formula (I) but contains additional processing oil in a phr amount equal to the amount of the at least one nucleating agent of formula (II), and (ii) exhibits strain-induced crystallization.

As discussed above, in a third embodiment, the present disclosure is directed to a method of achieving reduced wear or improved durability in a tire tread or tire sidewall. The method comprises incorporating the rubber composition of the first or second embodiment into a tire tread or sidewall. In other words, the third embodiment is directed to a method of achieving wear or improved durability in a tire tread or tire sidewall by incorporating a first or second rubber composition, as follows, into a tire tread or tire sidewall. The first rubber composition comprises: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent having formula (I): $M_2(O_2CR)_4$ (I), where M is a transition metal selected from the group consisting of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, mercury, and iridium and R is selected from C3-C18 alkyl; (d) 1 to 20 phr of at least one processing oil; and (e) 0-100 phr of at least one reinforcing filler. Furthermore, upon curing this first rubber composition meets at least one of (i) or (ii), as follows: (i) exhibits reduced wear as exhibited by having a wear index (measured at a slip percentage of 25%) that is 110% or higher, based upon a comparative rubber compound that contains no nucleating agent of formula (I) but contains additional processing oil in a phr amount equal to the amount of the at least one nucleating agent of formula (I); and (ii) exhibits strain-induced crystallization. The second rubber composition comprises: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent with a molecular weight of 250-1000 grams/mole and having formula (II): $N(R^2NHC(=O)R^3)_3$ (II), wherein $R^2$ is selected from C1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic; (d) 1 to 20 phr of at least one processing oil; and (e) 0-100 phr of at least one reinforcing filler. Furthermore, upon curing the second rubber composition meets at least one of (i) or (ii), as follows: (i) exhibits reduced wear as exhibited by having a wear index (measured at a slip percentage of 65%) that is 110% or higher, based upon a comparative rubber compound that contains no nucleating agent of formula (I) but contains additional processing oil in a phr amount equal to the amount of the at least one nucleating agent of formula (II), and (ii) exhibits strain-induced.

As discussed above, in a fourth embodiment, the present disclosure is directed to a method of achieving strain-induced crystallization in a synthetic rubber-based rubber composition. The method comprises using a rubber composition of the first or second embodiment, along with a cure package, wherein upon curing the rubber composition exhibits strain-induced crystallization. In other words, the fourth embodiment is directed to a method of achieving strain-induced crystallization in a synthetic rubber-based rubber composition, where that rubber composition comprises a first or second rubber composition, as follows. The first rubber composition comprises: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent having formula (I): $M_2(O_2CR)_4$ (I), where M is a transition metal selected from the group consisting of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, mercury, and iridium and R is selected from C3-C18 alkyl; (d) 1 to 20 phr of at least one processing oil; and (e) 0-100 phr of at least one reinforcing filler. Furthermore, upon curing this first rubber composition meets at least one of (i) or (ii), as follows: (i) exhibits reduced wear as exhibited by having a wear index (measured at a slip percentage of 25%) that is 110% or higher, based upon a comparative rubber compound that contains no nucleating agent of formula (I) but contains additional processing oil in a phr amount equal to the amount of the at least one nucleating agent of formula (I); and (ii) exhibits strain-induced crystallization. The second rubber composition comprises: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent with a molecular weight of 250-1000 grams/mole and having formula (II): $N(R^2NHC(=O)R^3)_3$ (II), wherein $R^2$ is selected from C1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic; (d) 1 to 20 phr of at least one processing oil; and (e) 0-100 phr of at least one reinforcing filler. Furthermore, upon curing the second rubber composition meets at least one of (i) or (ii), as follows: (i) exhibits reduced wear as exhibited by having a wear index (measured at a slip percentage of 65%) that is 110% or higher, based upon a comparative rubber compound that contains no nucleating agent of formula (I) but contains additional processing oil in a phr amount equal to the amount of the at least one fatty nucleating agent of formula (II), and (ii) exhibits strain-induced crystallization.

DEFINITIONS

The terminology as set forth herein is for description of the embodiments only and should not be construed as limiting the invention as a whole.

As used herein, the term "alkyl" refers to saturated, monovalent or divalent hydrocarbon moieties having linear or branched structure, optionally having one or more methylene therein replaced by oxygen, nitrogen, or sulfur.

As used herein, the term "alkenyl" refers to monovalent or divalent hydrocarbon moieties having linear or branched structure and at least one double-bond between carbons, optionally having one or more methylene therein replaced by oxygen, nitrogen, or sulfur.

As used herein, the term "aromatic" includes monocyclic aromatic compounds based on carbon (i.e., benzene), monocyclic heteroatom-containing aromatic compounds (e.g., furan, pyrrole, thiophene, pyridine), and polycyclic aromatic compounds—both those based on carbon (e.g., naphthalene, anthracene) and those containing heteroatoms (e.g., quinoline).

As used herein, the abbreviation "mL" means milliliters.

As used herein, the term "phr" means parts per one hundred parts rubber. The 100 parts rubber includes the total of the (a) at least one polymer or copolymer and the (b) at least one polymer or copolymer.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber or dandelion-sourced natural rubber).

As used herein the term "natural rubber" means naturally occurring rubber such as can be harvested from sources such as Hevea rubber trees, guayule shrubs and dandelions (e.g., TKS). In other words, the term "natural rubber" should not be construed as including synthetic polyisoprene.

Polymers

As discussed above, the rubber compositions according to the first-fourth embodiments comprise: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof. In various instances herein, the phrase "component (a)" and "component (b)" are used to refer to the foregoing. In certain embodiments of the first-fourth embodiments, the rubber composition comprises component (a) in an amount of 80-100 phr. In certain such embodiments, component (a) comprises 80-100 phr of a synthetic conjugated diene monomer-containing polymer selected from the group consisting of polybutadiene with a cis 1,4-bond content of 85% or greater, polyisoprene and combinations thereof, and 0-20 phr of a conjugated diene monomer containing polymer selected from the group consisting of polybutadiene with a cis 1,4-bond content of less than 85%, styrene-butadiene copolymer, neoprene, isobutylene, natural rubber, and combinations thereof. It should be understood that the rubber compositions according to the first-fourth embodiments can include for component (a) 50-100 phr (in total) of one or more than one of polybutadiene with a cis 1,4-bond content of 85% or greater, one or more than one polyisoprene, and combinations thereof.

As discussed above, according to the first-fourth embodiments, the rubber compositions comprise a component (a) that includes at least one polymer or copolymer selected from the group consisting of synthetic conjugated diene monomer-containing polymers, synthetic conjugated diene monomer-containing copolymers, and combinations thereof. Non-limiting examples of synthetic conjugated diene monomer-containing polymers are polybutadiene and polyisoprene. Non-limiting examples of synthetic conjugated diene monomer-containing copolymers are styrene-butadiene copolymer and styrene-isoprene copolymer.

As discussed above, in certain embodiments according to the first-fourth embodiments, the synthetic conjugated diene monomer-containing polymer of component (a) includes polybutadiene and the polybutadiene has a cis 1,4-bond content of 85% of greater. In certain embodiments of the first-fourth embodiments, the polybutadiene has a cis 1,4-bond content of 90% or greater, 92% or greater, or 95% or greater. In certain embodiments of the first-fourth embodiments, the polybutadiene has a cis 1,4-bond content of 85-99%, 85-98%, 85-97%, 90-99%, 90-98%, 90-97%, 92-99%, 92-98%, 92-97%, 95-99%, 95-98%, or 95-97%.

Generally, various polymerization methods are known for producing polybutadiene having a cis 1,4-bond content of 85% or greater, 90% or greater, 92% or greater, or 95% or greater and it should be understood that the particular method by which the polybutadiene is produced is not limited as long as the resulting polybutadiene has the specified cis 1,4-bond content. The percentages are based upon the number of diene mer units adopting the cis-1,4 linkage versus the total number of diene mer units. Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, 7,094,849, all of which are hereby incorporated by reference. Exemplary polymerization methods include, but are not limited to, those employing Ziegler-Natta catalysts based on transition metals (e.g., lanthanides such as neodymium), nickel catalysts and titanium-based catalysts as well as solution, emulsion and bulk polymerization processes. Generally, the cis 1,4-, vinyl 1,2-, and trans 1,4-bond linkage contents in a given polymer such as polybutadiene can be determined by standard and well-established analytical methods such as infrared spectroscopy.

As discussed above, in certain embodiments according to the first-fourth embodiments, the synthetic conjugated diene monomer-containing polymer of component (a) includes polyisoprene. In certain embodiments according to the first-fourth embodiments, the polyisoprene is a high cis polyisoprene. In certain embodiments according to the first-fourth embodiments, the high cis polyisoprene has a cis 1,4-bond content of 90% of greater. In certain embodiments of the first-fourth embodiments, the polyisoprene has a cis 1,4-bond content of 90% or greater, 92% or greater, or 95% or greater. In certain embodiments of the first-fourth embodiments, the polyisoprene has a cis 1,4-bond content of 90-99%, 90-98%, 90-97%, 92-99%, 92-98%, 92-97%, 95-99%, 95-98%, or 95-97%.

Generally, various polymerization methods are known for producing polyisoprenes, including polyisoprenes having a cis 1,4-bond content of 90% or greater, and it should be understood that the particular method by which the polyisoprene is produced is not limited as long as the resulting polymer has the desired cis 1,4-bond content. As previously discussed with respect to polybutadiene, the percentages are based upon the number of diene mer units adopting the cis-1,4 linkage versus the total number of diene mer units. Polymerization of high-cis polyisoprene is described in U.S. Pat. Nos. 8,664,343; 8,188,20; 7,008,899; 6,897,270; 6,699,813, all of which are hereby incorporated by reference. Exemplary polymerization methods include, but are not limited to, those employing Ziegler-Natta catalyst systems and those employing anionic polymerization with organometallic catalysts such as alkyl lithium in hydrocarbon solvents. As previously discussed with respect to polybutadiene, the cis-1,4-, 1,2-, and trans-1,4-linkage contents in a given polymer such as polyisoprene can be determined by standard and well-established analytical methods such as infrared spectroscopy.

As discussed above, in certain embodiments of the first-fourth embodiments, component (a) of the rubber composition comprises 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof. Various methods are known for producing each of the enumerated conjugated diene monomer-containing polymers and copolymers. As well, numerous commercial sources of each are well-known. As non-limiting examples, Firestone Polymers offers various grades of its Diene™ polybutadiene which has a cis 1,4-bond content of 40% as well as various grades of its Duradene™ solution polymerized styrene-butadiene copolymer. Other commercial sources of the enumerated conjugated diene monomer containing polymers and copolymers are well known, including sources for emulsion polymerized styrene-butadiene copolymer, functionalized versions of styrene-butadiene copolymer, neoprene, isobutyl and natural rubber.

As discussed above, according to the first-fourth embodiments, the rubber compositions comprise 0-50 phr of a component (b) that includes at least one polymer or copolymer selected from the group consisting of monoolefin-containing polymers, copolymers of at least one monoolefin and at least one alpha-olefin, and combinations thereof. In certain embodiments of the first-fourth embodiments, the component (b) comprises at least one copolymer of a monoolefin and an alpha-olefin. As used herein the phrase copolymer of a monoolefin and an alpha-olefin should be understood to include polymers that include these monomers in addition to one or more additional monomer, non-limiting examples of which include terpolymers such as ethylene propylene diene monomer rubber (EPDM). In certain such embodiments at least one of the following is met: the monoolefin is ethylene; and the alpha-olefin is selected from the group consisting of propylene, 1-butene, 1-pentene, 1-hexene, 1-octene and mixtures thereof. As those skilled in the art will understand, alpha-olefins also represent a sub-group of olefins, with the alpha-olefins having a double-bond at the primary or alpha-carbon. Generally, alpha-olefins may be linear or branched. Monoolefins also represent a sub-group of olefins, with the monoolefins having one double bond. Exemplary monoolefins suitable for use as the monoolefin in certain embodiments of the first-fourth embodiments include C2-C30 olefins such as ethylene, propylene, and cycloolefins such as cyclopentene, cycloheptene, norbornene, 5-methyl-norbornene, and tetracyclodecene. Exemplary alpha-olefins suitable for use as the alpha-olefin in certain embodiments of the first-fourth embodiments include 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. In certain embodiments of the first-fourth embodiments, the rubber compositions comprise for component (b) an ethylene-propylene copolymer (also called EPM copolymer) in an amount of up to 50 phr, including up to 25 phr, including up to 10 phr.

Nucleating Agent

As discussed above, according to the first embodiment and certain embodiments of the third and fourth embodiments, the rubber composition comprises 1-10 phr of at least one nucleating agent having formula (I). Formula (I) is as follows: $M_2(O_2CR)_4$ (I), where M is a transition metal selected from the group consisting of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, mercury, and iridium and R is selected from C3-C18 alkyl. Based upon the presence of the $O_2C$ within formula (I), the nucleating agent can be described as a metal carboxylate, more specifically a bimetallic tetracarboxylate. In certain embodiments according to the first, third and fourth embodiments, the at least one nucleating agent of formula (I) has R selected from C6 to C12 alkyl. In certain embodiments according to the first, third and fourth embodiments, the at least one nucleating agent of formula (I) has M selected from the group consisting of copper, zinc, cobalt, iron and manganese. In certain embodiments according to the first, third and fourth embodiments, the nucleating agent of formula (I) has M of copper 2+, i.e., copper with a valency of 2. Generally, it should be understood that the rubber compositions according to the first, third and fourth embodiments, can include one, two, or more nucleating agents having formula (I), with the total amount of nucleating agent(s) being 1 to 10 phr. In certain embodiments of the first, third and fourth embodiments, the rubber composition comprises one nucleating agent having formula (I). In certain embodiments of the first, third and fourth embodiments the rubber composition comprises at least one nucleating agent having formula (I) in combination with at least one nucleating agent having formula (II), with a total amount of all nucleating agents being 1-10 phr.

As discussed above, according to the second embodiment and certain embodiments of the third and fourth embodiments, the rubber composition comprises 1-10 phr of at least one nucleating agent having formula (II) and having a molecular weight of 250-1000 grams/mole. Formula (II) is as follows: $N(R^2NHC(=O)R^3)_3$ (II), wherein $R^2$ is selected from C1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic. In certain embodiments of the second, third and fourth embodiments, the at least one nucleating agent of formula (II) has $R^3$ with the formula phenyl-$R^4$ and $R^4$ is selected from the group consisting of C1-C20 alkyl, C2 to C20 alkenyl, C3 to C20 cycloalkyl, and C5 to C20 aromatic. In certain embodiments of the second, third and fourth embodiments, the at least one nucleating agent of formula (II) comprises N,N',N''-(nitrilotri-2,1-ethanediyl)tris[4-ethylbenzamide]. In certain embodiments of the second, third and fourth embodiments, the at least one nucleating agent of formula (II) has a melt temperature of 60-170° C., including 100-140° C. Generally, it should be understood that the rubber compositions according to the second, third and fourth embodiments, can include one, two, or more nucleating agents having formula (II). In certain embodiments of the second, third and fourth embodiments, the rubber composition comprises one nucleating agent having formula (II). In certain embodiments of the second, third and fourth embodiments the rubber composition comprises at least one nucleating agent having formula (II) in combination with at least one nucleating agent having formula (I), with a total amount of all nucleating agents being 1-10 phr (which should be understood to include 2-5 phr).

In certain embodiments of the first-fourth embodiments, the at least one nucleating agent, either of formula (I) or formula II), is present in an amount of 2-5 phr. As discussed above, it should be understood that the total amount of nucleating agent in the rubber compositions of the first-fourth embodiments is 1-10 phr, and in certain embodiments 2-5 phr. In other words, when more than one nucleating agent is utilized the total amount is 1-10 phr (which should be understood to include 2-5 phr).

Processing Oil

As discussed above, according to the first-fourth embodiments, the rubber composition comprises 1 to 20 phr of at least one processing oil. Various types of processing oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15 and FLEXON 683 from EXXONMOBLE, VIVATEC 200 from BP, PLAXOLENE MS from TOTALFINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil.

In certain embodiments of the first-fourth embodiments, the total combined amount of the at least one nucleating agent, whether of formula (I) or formula (II), and the at least one processing oil in the rubber composition is not more than 20 phr. In certain such embodiments, it should be understood that the amount of at least one nucleating agent, whether of formula (I) or formula (II) is 1-10 phr and the amount of at least one processing oil is 10-19 phr. In certain such embodiments, the amount of at least one nucleating agent, whether of formula (I) or formula (II), is 2-5 phr and the amount of at least one processing oil is 15-18 phr, including 5-15 phr.

Filler

As discussed above, according to the first-fourth embodiments, the rubber composition comprises 0-100 phr of at least one reinforcing filler. In certain embodiments of the first-fourth embodiments, the total amount of the reinforcing filler is 5-100 phr. In certain embodiments of the first-fourth embodiments, the total amount of the reinforcing filler is 20-100 phr. Preferably, the rubber compositions according to the first-fourth embodiments include 0-100 phr, including 5-100 phr, and 20-100 phr, of at least one reinforcing filler which comprises of at least one of silica or carbon black or a combination of both.

As used herein, the term "reinforcing filler" is intended to include both carbon black filler and inorganic filler. Thus, according to the first-fourth embodiments disclosed herein, the rubber composition includes (in total) 0-100 phr, including 5-100 phr, including 20-100 phr, of at least one of: one or more carbon blacks, and one or more inorganic fillers. In certain such embodiments, the rubber composition includes both at least one carbon black and at least one inorganic filler. Suitable inorganic fillers for use in the rubber compositions according to the first-fourth embodiments are not particularly limited and non-limiting examples include: silica, aluminum hydroxide, talc, clay, alumina ($Al_2O_3$), aluminum hydrate ($Al_2O_3H_2O$), aluminum hydroxide (Al$(OH)_3$), aluminum carbonate ($Al_2(CO_3)_2$), aluminum nitride, aluminum magnesium oxide ($MgOAl_2O_3$), aluminum silicate ($Al_2SiO_5$, $Al_4.3SiO_4.5H_2O$ etc.), aluminum calcium silicate ($Al_2O_3.CaO_2SiO_2$, etc.), pyrofilite ($Al_2O_34SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), calcium silicate ($Ca_2SiO_4$ etc.), magnesium carbonate, magnesium hydroxide ($MH(OH)_2$), magnesium oxide (MgO), magnesium carbonate ($MgCO_3$), magnesium silicate ($Mg_2SiO_4$, $MgSiO_3$ etc.), magnesium calcium silicate ($CaMgSiO_4$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

In certain embodiments of the first-fourth embodiments, the silica utilized (silicon dioxide) includes wet-process, hydrated silica produced by a chemical reaction in water, and precipitated as ultra-fine spherical particles. One or more than one type of silica can be utilized. In certain of the foregoing embodiments, the silica has a surface area (nitrogen surface area) of about 32 to about 400 $m^2/g$, in another embodiment about 100 to about 250 $m^2/g$, in another embodiment about 200 to about 300 $m^2/g$, and in yet another embodiment, about 150 to about 220 $m^2/g$. The pH of the silica filler in certain of the foregoing embodiments is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ (Bary AG), Ultrasil™ VN2, VN3 (Degussa), and HuberSil™ 8745 (Huber).

In certain embodiments of the first-fourth embodiments, the carbon black(s) utilized may include any of the commonly available, commercially-produced carbon blacks. These include those having a surface area (EMSA) of at least 20 $m^2$/gram and in other embodiments at least 35 $m^2$/gram up to 200 $m^2$/gram or higher. Surface area values include those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used. Exemplary carbon blacks include those bearing ASTM designation (D-1765-82a) N-110, N-220, N-339, N-330, N-351, N-550, and N-660. In one or more embodiments, the carbon black may include oxidized carbon black. One or more than one carbon black may be utilized.

Cure Package

In certain embodiments of the first-fourth embodiments, the rubber composition includes a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the first-fourth embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-fourth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-fourth embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Mixing of the Fillers

Where a rubber composition according to the first-fourth embodiments includes fillers other than (or in addition to) carbon black, a separate re-mill stage often is employed for separate addition of the other fillers. This stage often is performed at temperatures similar to, although often slightly lower than, those employed in the masterbatch stage, i.e., ramping from about 90° C. to a drop temperature of about 150° C. For purposes of this application, the term "masterbatch" means the composition that is present during the masterbatch stage or the composition as it exists during any re-mill stage, or both.

Curatives, accelerators, etc., are generally added at a final mixing stage. To avoid undesirable scorching and/or premature onset of vulcanization, this mixing step often is done at lower temperatures, e.g., starting at about 60° to about 65° C. and not going higher than about 105° to about 110° C. For purposes of this application, the term "final batch" means the composition that is present during the final mixing stage.

Reduced Wear or Improved Durability

As previously discussed, according to the first embodiment disclosed herein, the rubber composition meets at least one of (i) or (ii), where (i) is as follows: exhibits reduced wear as exhibited by having a wear index (measured at 65% slip) that is 110% or higher, based upon a comparative rubber compound that contains no nucleating agent of formula (I) but contains additional processing oil in a phr amount equal to the amount of the at least one nucleating agent in the synthetic conjugated diene monomer containing polymer composition. As previously discussed, according to the second embodiment disclosed herein, the rubber composition meets at least one of (i) or (ii), where (i) is as follows: exhibits reduced wear as exhibited by having a wear index (measured at 25% slip) that is 110% or higher, based upon a comparative rubber compound that contains no nucleating agent of formula (II) but contains additional processing oil in a phr amount equal to the amount of the at least one nucleating agent in the synthetic conjugated diene monomer containing polymer composition.

As previously discussed, the third embodiment disclosed herein is directed to a method of achieving reduced wear or improved durability (the two terms are used interchangeably herein) in a tire tread or tire sidewall, the method comprising incorporating the rubber composition according to the first embodiment or according to the second embodiment into a tire tread or tire sidewall. In other words, the third embodiment is directed to a method of achieving reduced wear or improved durability in a tire tread or tire sidewall, the method comprising incorporation a rubber composition comprising components (a)-(e) into a tire tread or tire sidewall. The components are: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent of formula (I) or formula (II); (d) 1 to 20 phr of at least one processing oil; and (e) 0-100 phr of at least one reinforcing filler. Formula (I) and Formula (II) are as discussed infra. Furthermore, upon curing, the rubber composition incorporating at least one nucleating agent according to Formula (I) meets at least one of the following conditions (i) or (ii), as follows: (i) exhibits reduced wear as exhibited by having a wear index (measured at 65% slip) that is 110% or higher, based upon a comparative rubber compound that contains no nucleating agent of formula (I) but contains additional processing oil in a phr amount equal to the amount of the at least one nucleating agent in the synthetic conjugated diene monomer containing polymer composition, and (ii) exhibits crystallization. Furthermore, upon curing, the rubber composition incorporating at least one nucleating agent according to Formula (II) meets at least one of the following conditions (i) or (ii), as follows: (i) exhibits reduced wear as exhibited by having a wear index (measured at 25% slip) that is 110% or higher, based upon a comparative rubber compound that contains no nucleating agent of formula (I) but contains additional processing oil in a phr amount equal to the amount of the at least one nucleating agent in the synthetic conjugated diene monomer containing polymer composition, and (ii) exhibits crystallization.

As used herein, the improvement in the wear or durability in a tire tread or tire sidewall is measured in comparison to the use of a "control" rubber composition that is identical in composition other than containing additional processing oil in a phr amount equal to the amount of the at least one nucleating agent (whether of formula (I) of formula (II)) that is used in the subject rubber composition. As a non-limiting example, if the subject rubber composition contains 4 phr of nucleating agent and 6 phr of processing oil, the "control" or comparative rubber composition would contain 0 phr of nucleating agent and 10 phr of processing oil. The improvement in wear or durability can be measured by calculating the wear index of the subject rubber composition. An improvement in wear or durability is considered to exist when the subject rubber composition has a wear index (measured at a specified slip percentage) that is 110% or higher, based upon a comparative rubber compound that contains no nucleating agent (whether of formula (I) or formula (II)) but contains additional processing oil in a phr amount equal to the amount of the at least one nucleating agent in the subject rubber composition. Correspondingly, such a rubber composition can also be said to exhibit reduced wear or have increased abrasion resistance. In certain embodiments according to the first and second embodiments, the improvement in wear or durability is exhibited by the subject rubber composition either: comprising a nucleating agent having formula (I) and exhibiting a wear index at 25% slip that is at least 15% higher than the wear index of the comparative rubber compound; or comprising a nucleating agent having formula (II) and exhibiting a wear index at 65% slip that is at least 15% higher than the wear index of the comparative rubber compound. In certain embodiments according to the first and second embodiments, the improvement in wear or durability is exhibited by the subject rubber composition either: comprising a nucleating agent having formula (I) and exhibiting a wear index at 25% slip that is at least 20% higher than the wear index of the comparative rubber compound; or comprising a nucleating agent having formula (II) and exhibiting a wear index at 65% slip that is at least 20% higher than the wear index of the comparative rubber compound.

Strain-Induced Crystallization

Strain-induced crystallization is a phase transformation that an amorphous material undergoes when subjected to stress (strain). While synthetic rubbers such as polyisoprene, polybutadiene and styrene-butadiene copolymer do not usually exhibit the high level of strain-induced crystallization that natural rubber inherently possesses, the use of the at least one nucleating agent of formula (I) or formula (II), as disclosed herein, allows such synthetic rubbers to exhibit strain-induced crystallization.

As previously discussed, according to the first and second embodiments disclosed herein, the rubber compositions meet at least one of (i) or (ii), where (ii) is as follows: exhibits strain-induced crystallization.

As previously discussed, the fourth embodiment disclosed herein is directed to a method of achieving strain-induced crystallization The method comprises using the rubber composition of the first or second embodiment, along with a cure package, wherein upon curing the rubber composition exhibits strain-induced crystallization. In other words, the fourth embodiment is directed to a method of achieving strain-induced crystallization in a synthetic rubber-based rubber composition, where that rubber composition comprises a first or second rubber composition, as follows. The first rubber composition comprises: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent having formula (I): $M_2(O_2CR)_4$ (I), where M is a transition metal selected from the group consisting of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, mercury, and iridium and R is selected from C3-C18 alkyl; (d) 1 to 20 phr of at least one processing oil; and (e) 0-100 phr of at least one reinforcing filler. Furthermore, upon curing this first rubber composition meets at least one of (i) or (ii), as follows: (i) exhibits reduced wear as exhibited by having a wear index (measured at a slip percentage of 25%) that is 110% or higher, based upon a comparative rubber compound that contains no nucleating agent of formula (I) but contains additional processing oil in a phr amount equal to the amount of the at least one nucleating agent of formula (I); and (ii) exhibits strain-induced crystallization. The second rubber composition comprises: (a) 50-100 phr of at least one polymer or copolymer selected from the group consisting of synthetic conjugated diene monomer-containing polymers, synthetic conjugated diene monomer-containing copolymers, and combinations thereof; (b) 0-50 phr of at least one polymer or copolymer selected from the group consisting of monoolefin-containing polymers, copolymers of at least one monoolefin and at least one alpha-olefin, and combinations thereof; (c) 1-10 phr of at least one nucleating agent with a molecular weight of 250-1000 grams/mole and having formula (II): $N(R^2NHC(=O)R^3)_3$ (II), wherein $R^2$ is selected from C1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic; (d) 1 to 20 phr of at least one processing oil; and (e) 0-100 phr of at least one reinforcing filler. Furthermore, upon curing the second rubber composition meets at least one of (i) or (ii), as follows: (i) exhibits reduced wear as exhibited by having a wear index (measured at a slip percentage of 65%) that is 110% or higher, based upon a comparative rubber compound that contains no nucleating agent of formula (I) but contains additional processing oil in a phr amount equal to the amount of the at least one nucleating agent of formula (II), and (ii) exhibits strain-induced crystallization.

The presence of strain-induced crystallization can be measured by any using Differential Scanning calorimetry (DSC), Wide Angle X-Ray Diffraction (WAXD), or by taking temperature sweep measurements. Established methods for making these measurements are well-known. A non-limiting example includes ASTM D3418-12e1 (Standard Test Method for Transition Temperatures and Enthalpies of Fusion and Crystallization of Polymers by Differential Scanning calorimetry). Generally, the measurements are made by raising the composition to above its melt temperature. DSC apparatus are generally used to heat a sample of polymer to a designated temperature, at a designated rate and are capable of measuring both the amount of heat required to raise the temperature of the sample and the increase in temperature. WAXD is frequently used to characterize strain-induced crystallization in polymers. WAXD allows identification of the crystalline phase according analysis of the patterns generated. Preferably, the subject composition will show increased strain-induced crystallization above the melt temperature as compared to a composition that contains no fatty acid amide but contains additional processing oil in the same phr amount, according to at least one of the foregoing methods, i.e., DSC, WAXD and temperature sweep. In certain embodiments, the subject rubber composition will show increased strain-induced crystallization according to all three of the foregoing methods.

Tires and Tire Components

In certain embodiments, the rubber compositions according to the first-fourth embodiments are utilized in a tire component. Non-limiting examples of such tire components, include, but are not limited to a tire sidewall and a tire tread.

In certain embodiments, the rubber compositions according to the first-fourth embodiments are utilized in a tire sidewall. In certain embodiments, the rubber compositions according to the first-fourth embodiments are utilized in a tire sidewall. The following embodiments should also be considered to be fully disclosed herein: a tire tread comprising the rubber composition according to any of the foregoing embodiments of the first-fourth embodiments (i.e., as described throughout the present application), a tire sidewall comprising the rubber composition according to any of the foregoing embodiments of the first-fourth embodiments (i.e., as described throughout the present application), and a tire incorporating such a tire tread and/or such a tire sidewall.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the polymers or copolymers, fillers, processing oil, and other ingredients (e.g., antioxidant, wax, zinc oxide, stearic acid and curative package ingredients) utilized in the following examples should not be interpreted as limiting since other such ingredients consistent with the disclosure in the Detailed Description can be utilized in substitution. In other words, the particular nucleating agents and their amounts in the following examples should be understood to apply to the more general content of the Detailed Description.

Unless indicated to the contrary herein, all reagents and solvents were used as received from Sigma Aldrich. Proton NMR spectra were recorded on a Varian 300 mHz Mercury Plus spectrometer and the spectra are reported on the δ scale in parts per million and referenced to CHCl3 at δ 7.24 ppm. Infrared data were obtained in cyclohexane solutions using a Perkin-Elmer Spectrum G. Elemental analysis was conducted by Galbraith Laboratories and values are reported as percentages.

Mooney viscosity (ML1+4) values were determined with an Alpha Technologies Mooney viscometer (with a large rotor) The sample was preheated at 130° C. for 1 minute before the rotor was started. The Mooney Viscosity measurement was recorded as the torque after the rotor rotated 4 minutes at 130° C.

Modulus values, including the $\kappa_1$ Modulus ratio were determined as follows, following the guidelines, but not restricted to, the standard procedure described in ASTM-D412, using micro dumbbell specimens with a dimension of 4 mm in width and 1.91 mm in thickness. A specific gauge length of 44 mm was used for the tensile test. Specimens were strained at a constant rate and the resulting force is recorded as a function of extension (strain). The dumbbell shaped specimen was stretched at a given temperature (after allowing 20 minutes equilibration time) until it broke. A stress versus strain plot was created. The Modulus at 300% strain and at 50% strain was determined from the plot and the Modulus values were used to calculate the $\kappa_1$ Modulus ratio values. For the ring tear strength testing, the specimen geometry was a round ring having a width of 0.05 inches and of a thickness of 0.075 inches. Rings were notched at two places on the inner circumference of the ring at equidistant locations. The specimen was tested at a specific gauge length of 1.0 inch. Force readings are expressed as engineering stresses by reference to the original cross-sectional area of the test piece. Specimens were tested at 23° C.

The wear resistance of the test samples were evaluated using the Lambourn Abrasion test. Test specimens were rubber wheels of about 48 mm in outside diameter, about 22 mm in inside diameter and about 4.8 mm in thickness. The test specimens were placed on an axle and run at various slip ratios against a driven abrasive surface for approximately 75 seconds. The abrading surface used was 120 grit 3M-ite. A load of about 2.5 kg was applied to the rubber wheel during testing. A linear, least squares curve-fit was applied to the weight loss data as a function of time. The slope of the line is the abrasion rate. The reported wear index is one-hundred multiplied by the control compound abrasion rate divided by the subject compound abrasion rate. Thus, an wear index greater than 100 indicates that the subject composition is better (abrades at a lower rate) than the control compound.

Example 1: Synthesis of N,N′,N″-(nitrilotri-2,1-ethanediyl)tris[4-ethylbenzamide] (TREN)

Under an argon atmosphere, tris (2-aminoethyl)amine (9.76 grams, 66.7 millimoles) was added to anhydrous pyridine (50 mL) with vigorous stifling. After cooling to 0° C., 4-ethylbenzoyl chloride (34.9 grams, 206.9 millimoles) was added dropwise over 10 minutes, and the mixture was stirred and allowed to warm to room temperature. After stifling for 2 hours, the mixture was combined with diethyl ether (300 mL) and washed with saturated sodium bicarbonate in water (3×100 mL), water (3×100 mL), and dried with anhydrous sodium sulfate. The solvent was removed through evaporation at 50° C. to yield a dark red solid. The crude product was recrystallized by dissolving the solid in a minimum amount of dichloromethane/ethyl acetate (1:6) and cooling to −30° C. After two recrystallizations followed by drying under vacuum, 13.4 grams (37%) of off-white, needle-like crystals were obtained. $^1$H NMR (300 MHz, CDCl$_3$, δ): 1.15 (t, J=7.6 Hz, 9H, —CH$_3$), 2.54 (q, J=7.6 Hz, 6H, —CH2-CH3), 2.68 (br m, 6H, —CH$_2$—CH$_2$—NH—), 3.52 (br m, 6H, —CH$_2$—CH$_2$—NH), 6.85 (d, J=8.4 Hz, 6H, Ar H), 7.42 (br s, 3H, NH) 7.56 (d, J=8.4 Hz, 6H, Ar H).

TREN has the following structure:

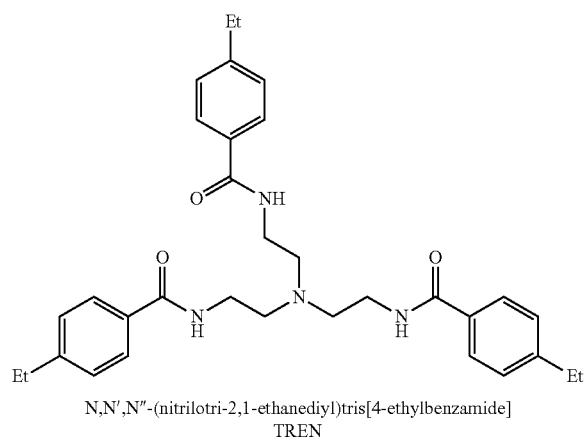 [SMILES: CCc1ccc(C(=O)NCCN(CCNC(=O)c2ccc(CC)cc2)CCNC(=O)c2ccc(CC)cc2)cc1]

N,N′,N″-(nitrilotri-2,1-ethanediyl)tris[4-ethylbenzamide]
TREN

TREN was tested in two polymers, low cis-polybutadiene (control) and high cis-polybutadiene. The base formulation is the same as in Example 1 and as shown in Table 1. The TREN was added at a concentration of 3 phr as partial oil replacement in 300-gram Brabender batches.

Physical testing results are shown below in Table 2 for both the low cis-polybutadiene (control) and the high cis-polybutadiene. As discussed above, the low cis-polybutadiene was used as a control polymer since it is unable to undergo strain-induced crystallization. No wear benefit of adding TREN to the low cis-polybutadiene was found. Wear improvement was found in high cis-polybutadiene samples where TREN was added, as evidenced by improvements in the 25% slip; this reinforces the hypothesis that TREN functions as a strain-induced crystallization nucleating agent.

TABLE 1

|  | Phr |
|---|---|
| Master Batch | |
| Polymer | 100 |
| Carbon black (N343) | 50 |
| Black Oil (Ergon) | 10 |
| Stearic Acid | 2 |
| Zinc Oxide | 2.5 |
| Wax | 2 |
| Antioxidant | 1 |
| Final Batch | |
| Master Batch | 167.5 |
| Sulfur | 1.3 |
| Accelerators | 1.9 |

TABLE 2

| | | | | |
|---|---|---|---|---|
| Low cis-polybutadiene (phr)[1] | 100 | 100 | 0 | 0 |
| High cis-polybutadiene (phr)[2] | 0 | 0 | 100 | 100 |
| Carbon black (phr) | 50 | 50 | 50 | 50 |
| Black oil (phr) | 10 | 7 | 10 | 7 |
| TREN (phr) | 0 | 3 | 0 | 3 |
| Indexed Mooney viscosity ML$_{1+4}$, 130° C. | | | | |
| Indexed κ$_1$ Modulus ratio (−20° C./23° C.) | | | | |
| Indexed Ring Tear Strength @ 23° C. (N/mm) | | | | |
| Wear Index (25% slip) | 100 | 101 | 100 | 119 |

[1]Polybutadiene having 33% cis 1,4-bond content, 55% trans 1,4-bond content and 12% vinyl 1,2-bond content.
[2]Polybutadiene having 96% cis 1,4-bond content.

Example 2: Further Use of TREN

TREN was synthesized as described above for Example 1.

TREN was tested in two polymers, low cis-polybutadiene (control) and high cis-polybutadiene (the same polymers as used in Example 1, above). The base formulation is the same as in Example 1 and as shown in Table 1. The TREN was added at a concentration of 3 phr as partial oil replacement in 300-gram Brabender batches.

Physical testing results are shown below in Table 3 for both the low cis-polybutadiene (control) and the high cis-polybutadiene. As discussed above, the low cis-polybutadiene was used as a control polymer since it is unable to undergo strain-induced crystallization. No wear benefit of adding TREN to the low cis-polybutadiene was found. Wear improvement was found in high cis-polybutadiene samples where TREN was added, as evidenced by improvements in the 25% slip, and the Pico wear indices; this reinforces the hypothesis that TREN functions as a strain-induced crystallization nucleating agent.

TABLE 3

| Low cis-polybutadiene (phr) | 100 | 100 | 0 | 0 |
|---|---|---|---|---|
| High cis-polybutadiene (phr) | 0 | 0 | 100 | 100 |
| Carbon black (phr) | 50 | 50 | 50 | 50 |
| Black oil (phr) | 10 | 7 | 10 | 7 |
| TREN (phr) | 0 | 3 | 0 | 3 |
| Indexed Mooney viscosity $ML_{1+4}$, 130° C. | 100 | 114 | 100 | 106 |
| Indexed $\kappa_1$ Modulus ratio (−20° C./23° C.) | 100 | 97 | 100 | 102 |
| Wear Index (25% slip) | 100 | 96 | 100 | 127 |

Example 3: $Cu_2(Dodecanoate)_4$ (Hereinafter Cu-1)

With vigorous stirring, sodium hydroxide (6 grams, 150 millimoles) dissolved in water (150 mL) was added to a mixture of dodecanoic acid (20 grams, 100 millimoles) and water (500 mL). Upon dissolution of the acid, the solution was neutralized (to pH=7) using concentrated sulfuric acid. Copper sulfate (9.6 grams, 60 millimoles) dissolved in water (200 mL) was added dropwise for 30 minutes as a blue-green solid precipitated from solution. After stirring for an additional 30 minutes, the solid was filtered from solution, washed with water (10 times with 50 mL each), and dried under vacuum at 50° C. to yield 21.01 grams (76% yield) of a light blue-green solid. Solution FT-IR (cyclohexane, cm-1): 2996, 2906, 2958, 2653, 1587, 1474, 1425, 1263, 1252, 1038, 899, 855. Analytical calculated for $C_{48}H_{92}O_8Cu_2$ with the following weight percentages: C, 62.37; H, 10.03; 0, 13.85; Cu, 13.75. Found: C, 62.44; H, 10.87; Cu, 13.19.

Cu-1 is also known as copper laurate and has the following structure:

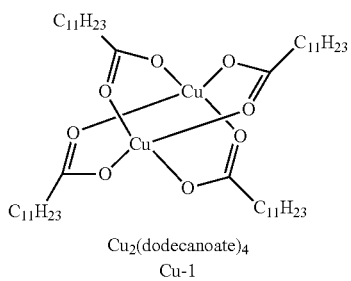

$Cu_2(dodecanoate)_4$
Cu-1

Example 4: $Cu_2$(2-Ethylhexanoate)$_4$ (Hereinafter Cu-2)

With vigorous stirring, sodium hydroxide (6 grams, 150 millimoles) dissolved in water (150 mL) was added to a mixture of 2-ethylhexanoic acid (14.4 grams, 100 millimoles) and water (100 mL). Upon dissolution of the acid, the solution was neutralized (to pH=7) using concentrated sulfuric acid. Copper sulfate (9.6 grams, 60 millimoles) dissolved in water (200 mL) was added dropwise for 30 minutes as a blue-green solid precipitated from solution. After stirring for an additional 30 minutes, the solid was filtered from solution, washed with water (10×100 mL each), and dried under vacuum at 50 C to yield 17.6 g (84%) of a light blue-green solid. Solution FT-IR (cyclohexane, cm-1): 2993, 2920, 2865, 2657, 1596, 1517, 1463, 1442, 1255, 1026, 889, 863. Analytical calculated for $C_{32}H_{60}O_8Cu_2$: with the following weight percentages: C, 54.91; H, 8.64; 0, 18.29; Cu, 18.16. Found: C, 54.30; H, 8.85; Cu, 18.93.

Cu-2 has the following structure:

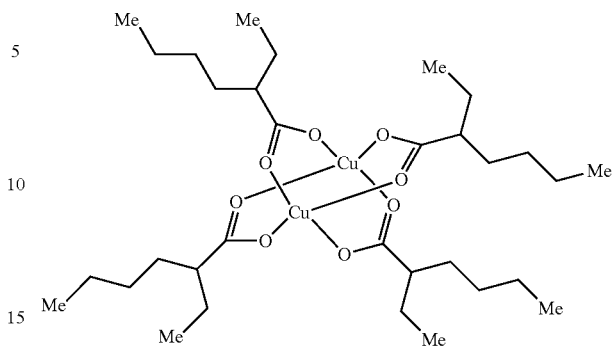

Each of the copper II carboxylates, i.e., Cu-1 and Cu-2, was tested in two polymers, low cis-polybutadiene (control) and high cis-polybutadiene. The base formulation was the same as in Example 1 and as shown in Table 1. Each compound was added at a concentration of 3 phr as partial oil replacement in 300-gram Brabender batches.

Physical testing results are shown below in Table 4 for both the low cis-polybutadiene (control) and the high cis-polybutadiene. As discussed above, the low cis-polybutadiene was used as a control polymer since it is unable to undergo strain-induced crystallization. Adding the copper carboxylates to the low cis-polybutadiene was not found to improve wear as evidenced by lack of any improvement in the 65% slip measurements. In contrast, wear improvement was found in high cis-polybutadiene samples where the copper carboxylates were added, as evidenced by improvements in the 65% slip; this reinforces the hypothesis these compounds function as strain-induced crystallization nucleating agents.

TABLE 4

| Low cis-polybutadiene (phr) | 100 | 100 | 100 | 0 | 0 | 0 |
|---|---|---|---|---|---|---|
| High cis-polybutadiene (phr) | 0 | 0 | 0 | 100 | 100 | 100 |
| Carbon black (phr) | 50 | 50 | 50 | 50 | 50 | 50 |
| Black oil (phr) | 10 | 7 | 7 | 10 | 7 | 7 |
| Cu-1 (phr) | 0 | 3 | 0 | 0 | 3 | 0 |
| Cu-2 (phr) | 0 | 0 | 3 | 0 | 0 | 3 |
| Indexed Mooney viscosity $ML_{1+4}$, 130° C. | 100 | 113 | 108 | 100 | 117 | 110 |
| Indexed $\kappa_1$ Modulus ratio (−20° C./23° C.) | 100 | 104 | 105 | 100 | 106 | 109 |
| Indexed Ring Tear Strength @ 23° C. (N/mm) | 100 | 105 | 109 | 100 | 96 | 107 |
| Wear Index (65% slip) | 100 | 72 | 82 | 100 | 120 | 138 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A rubber composition comprising:
   (a) 50-100 phr of at least one polymer or copolymer selected from the group consisting of synthetic conjugated diene monomer-containing polymers, synthetic conjugated diene monomer-containing copolymers, and combinations thereof;
   (b) 0-50 phr of at least one polymer or copolymer selected from the group consisting of monoolefin-containing polymers, copolymers of at least one monoolefin and at least one alpha-olefin, and combinations thereof;
   (c) 1-10 phr of at least one nucleating agent having formula (I)

$$M_2(O_2CR)_4 \quad (I)$$

where M is a transition metal selected from the group consisting of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, mercury, and iridium and R is selected from C3-C18 alkyl;
   (d) 1 to 20 phr of at least one processing oil;
   (e) 0-100 phr of at least one reinforcing filler and
   (f) a cure package including a vulcanizing agent consisting of a sulfur-based curative,
   wherein upon curing the rubber composition meets at least one of (i) or (ii), as follows:
   (i) exhibits reduced wear as exhibited by having a wear index (measured at a slip percentage of 25%) that is 110% or higher, based upon a comparative rubber compound that contains no nucleating agent of formula (I) but contains additional processing oil in a phr amount equal to the amount of the at least one nucleating agent of formula (I), and
   (ii) exhibits strain-induced crystallization.

2. The rubber composition according to claim 1, wherein R is selected from C6 to C12 alkyl.

3. The rubber composition according to claim 1, wherein M is selected from the group consisting of copper, zinc, cobalt, iron and manganese.

4. The rubber composition according to any of claim 1, wherein M is copper 2+.

5. A rubber composition comprising:
   (a) 50-100 phr of at least one polymer or copolymer selected from the group consisting of synthetic conjugated diene monomer-containing polymers, synthetic conjugated diene monomer-containing copolymers, and combinations thereof;
   (b) 0-50 phr of at least one polymer or copolymer selected from the group consisting of monoolefin-containing polymers, copolymers of at least one monoolefin and at least one alpha-olefin, and combinations thereof;
   (c) 1-10 phr of at least one nucleating agent with a molecular weight of 250-1000 grams/mole and having formula (II)

$$N(R^2NHC(=O)R^3)_3 \quad (II)$$

wherein $R^2$ is selected from C1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic;
   (d) 1 to 20 phr of at least one processing oil; and
   (e) 0-100 phr of at least one reinforcing filler,
   wherein upon curing the rubber composition meets at least one of (i) or (ii), as follows:
   (iii) exhibits reduced wear as exhibited by having a wear index (measured at 65% slip) that is 110% or higher, based upon a comparative rubber compound that contains no nucleating agent of formula (II) but contains additional processing oil in a phr amount equal to the amount of the at least one nucleating agent of formula (II), and
   (ii) exhibits strain-induced crystallization.

6. The rubber composition according to claim 5, wherein $R^3$ has the formula phenyl-$R^4$ and $R^4$ is selected from the group consisting of C1-C20 alkyl, C2 to C20 alkenyl, C3 to C20 cycloalkyl, and C5 to C20 aromatic.

7. The rubber composition according to claim 5, wherein the nucleating agent comprises N,N',N"-(nitrilotri-2,1-ethanediyl)tris[4-ethylbenzamide].

8. The rubber composition according to claim 5, wherein the at least one nucleating agent of formula (II) has a melt temperature of 60-170° C.

9. The rubber composition according to claim 5, wherein the at least one nucleating agent is present in an amount of 2 to 5 phr.

10. The rubber composition according to claim 5, wherein (a) is present in an amount of 80-100 phr and comprises:
   (i) 80-100 phr of a synthetic conjugated diene monomer-containing polymer selected from the group consisting of polybutadiene with a cis 1,4-bond content of 85% or greater, polyisoprene and combinations thereof, and
   (ii) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof.

11. The rubber composition according to claim 5, wherein the at least one polymer or copolymer of (b) comprises at least one copolymer of a monoolefin and an alpha-olefin, the monoolefin is ethylene and the alpha-olefin is selected from the group consisting of propylene, 1-butene, 1-pentene, 1-hexene, 1-octene and mixtures thereof.

12. The rubber composition according to claim 5, wherein the rubber composition either:
   comprises a nucleating agent having formula (I) and exhibits a wear index at 25% slip that is at least 15% higher than the wear index of the comparative rubber compound; or
   comprises a nucleating agent having formula (II) and exhibits a wear index at 65% slip that is at least 15% higher than the wear index of the comparative rubber compound.

13. The rubber composition according to claim 5, where the rubber composition either:
   comprises a nucleating agent having formula (I) and exhibits a wear index at 25% slip that is at least 20% higher than the wear index of the comparative rubber compound; or
   comprises a nucleating agent having formula (II) and exhibits a wear index at 65% slip that is at least 20% higher than the wear index of the comparative rubber compound.

14. The rubber composition according to claim 5, wherein (a) is present in an amount of 90-100 phr.

15. The rubber composition according to claim 5, wherein the combined amount of (c) and (d) is no more than 20 phr.

16. The rubber composition according to claim 5, further comprising:
   (f) a cure package.

17. A method of achieving reduced wear or improved durability in a tire tread or tire sidewall, the method comprising incorporating the rubber composition according to claim 16 into a tire tread or sidewall.

18. A method of achieving strain-induced crystallization in a synthetic rubber-based rubber composition comprising use of the rubber composition according to claim 16, wherein the at least one nucleating agent of (c) is mixed with (a), (b), (d), (e) and (f), and upon curing the rubber composition exhibits strain-induced crystallization.

19. A tire tread comprising the rubber composition of claim 16.

20. A tire sidewall comprising the rubber composition of claim 16.

21. A rubber composition comprising:
   (a) 50-100 phr of polybutadiene with cis 1,4-bond content of at least 90%;
   (b) 0-50 phr of at least one polymer or copolymer selected from the group consisting of monoolefin-containing polymers, copolymers of at least one monoolefin and at least one alpha-olefin, and combinations thereof;
   (c) 1-10 phr of at least one nucleating agent with a molecular weight of 250-1000 grams/mole and having formula (II)

$$N(R^2NHC(=O)R^3)_3 \qquad (II)$$

wherein $R^2$ is selected from C 1 to C20 alkyl, C2 to C20 alkenyl, C3 to C20 cycloalkyl and C5 to C20 aromatic, C7 to C20 alkaryl, and $R^3$ is selected from C3 to C20 alkyl, C3 to C20 cycloalkyl, C3 to C20 alkenyl, C3 to C20 alkynyl and C5 to C20 aromatic;
   (d) 1 to 20 phr of at least one processing oil; and
   (e) 0-100 phr of at least one reinforcing filler,
   wherein upon curing the rubber composition meets at least one of (i) or (ii), as follows:
   (i) exhibits reduced wear as exhibited by having a wear index (measured at 65% slip) that is 110% or higher, based upon a comparative rubber compound that contains no nucleating agent of formula (I) but contains additional processing oil in a phr amount equal to the amount of the at least one nucleating agent of formula (II), and
   (ii) exhibits strain-induced crystallization.

* * * * *